US012266497B2

(12) United States Patent
Gill-Gaviria et al.

(10) Patent No.: US 12,266,497 B2
(45) Date of Patent: *Apr. 1, 2025

(54) LINE-OF-SIGHT QUICK-ALIGNMENT LINKAGE FOR A THREE-PHASE ELECTRIC DISCONNECT SWITCH

(71) Applicant: Southern States, LLC, Hampton, GA (US)

(72) Inventors: Juan Camilo Gill-Gaviria, Alpharetta, GA (US); Joseph R Rostron, McDonough, GA (US)

(73) Assignee: SOUTHERN STATES, LLC, Hampton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/905,212

(22) Filed: Oct. 3, 2024

(65) Prior Publication Data

US 2025/0046531 A1 Feb. 6, 2025

Related U.S. Application Data

(63) Continuation-in-part of application No. 17/699,208, filed on Mar. 21, 2022, now Pat. No. 12,119,188.

(51) Int. Cl.
*H01H 9/02* (2006.01)
*H01H 21/22* (2006.01)

(52) U.S. Cl.
CPC .............. *H01H 9/02* (2013.01); *H01H 21/22* (2013.01)

(58) Field of Classification Search
CPC ............ H01H 9/02; H01H 21/22; H01H 3/02; H01H 31/04; H01H 31/02; H01H 15/24; H01H 9/24; H01H 27/10; H01R 13/04; H01R 13/62
See application file for complete search history.

(56) References Cited

U.S. PATENT DOCUMENTS

| | | | | | |
|---|---|---|---|---|---|
| 4,049,936 | A * | 9/1977 | Frink | H01H 3/30 | 200/48 R |
| 4,622,443 | A * | 11/1986 | Mooz | H01H 33/127 | 200/50.01 |
| 5,483,030 | A * | 1/1996 | Bridges | H01H 33/126 | 218/20 |
| 12,119,188 | B2 * | 10/2024 | Rostron | H01H 9/24 | |

* cited by examiner

*Primary Examiner* — Edwin A. Leon
(74) *Attorney, Agent, or Firm* — Mehrman Law Office; Michael J. Mehrman

(57) ABSTRACT

A line-of-sight quick-alignment linkage for a three-phase electric disconnect switch interconnects a drive pipe, actuator arm, and a calibration mechanism of the switch. The linkage includes a quick-alignment straight edge configured to be aligned with the line-of-sight from the pivot point of the drive pipe to the actuator arm when the drive pipe is in the fully closed drive pipe position. The calibration mechanism, the actuator arm, and other phase operating levers of the other phases are then set to their fully closed positions to calibrate the linkage. The quick-alignment straight edge may be positioned on the calibration mechanism along with a visual indicator parallel to quick-alignment straight edge.

14 Claims, 12 Drawing Sheets

LINE-OF-SIGHT QUICK-ALIGNMENT LINKAGE FOR A THREE-PHASE ELECTRIC DISCONNECT SWITCH

REFERENCE TO RELATED APPLICATION

This application is a continuation-in-part claiming filing priority to U.S. patent application Ser. No. 17/699,208 filed Mar. 21, 2022 (U.S. Pat. Pub. No. 2023/0298827), which is incorporated by reference.

TECHNICAL FIELD

The present invention relates to high-voltage electric switchgear and, more particularly, to a linkage for a three-phase electric disconnect switch including a straight edge alignment feature providing a visually intuitive guide for setting the linkage for the fully closed switch position.

BACKGROUND

This application is directed to a variation of the quick-alignment linkage described in U.S. Pat. Pub. No. 2023/0298827, in which the quick-alignment straight edge is aligned with the centerline of the drive pipe when setting the calibration mechanism. Although this configuration is suitable for certain embodiments, in other variations the drive pipe itself is not aligned with the actuator arm. This application is directed to this type of variation referred to as a line-of-sight quick-alignment-linkage.

While the conventional three-phase disconnect switch has served the industry well for decades, it experiences a significant drawback when initially setting up the conventional linkage for the fully closed switch position, which requires precise mechanical calibration. Each rotating insulator is mechanically fixed to a separate frame, which can result in slight differences in the relative positions of each insulator to the other insulators and to the linkage. The linkage must be calibrated precisely to ensure that each insulator rotates fully so that each blade seats properly within its respective jaws to properly close each phase of the switch. Calibrating the entire linkage is a painstaking process because multiple calibration points have to be manually adjusted. Each linkage pipe typically has its own length adjustment mechanism and changing the length or position of one piece of the linkage can impact the other parts of the linkage. As the relative angles between the linkage pipes and the rotating insulators is critical to the proper operation of the switch, setting the linkage to achieve the correct rotational angles of all six insulators requires multiple measurements and length adjustments. This frequently requires multiple trial-and-error adjustments to achieve the correct calibration. The process has been likened to tuning a piano, where adjustment of each string impacts the notes produced by the other strings.

SUMMARY

The shortcomings of conventional three-phase switch linkages are mitigated by a line-of-sight quick-alignment linkage for a three-phase electric disconnect switch, as well as a disconnect switch utilizing the line-of-sight quick-alignment linkage. An actuator connected to an actuator arm provides the motive force for opening and closing the switch. The actuator arm is connected to a drive pipe, which is connected through a series of mechanical connection to the other components of the linkage. The linkage includes a linkage pipe that rotates the phase insulators of the disconnect switch to open and close the switch. To aid in setting the linkage for the fully closed switch position, the linkage includes a quick-alignment straight edge configured to be aligned with the line-of-sight from the pivot point of the drive pipe to the actuator arm when the drive pipe is in the fully closed drive pipe position. The quick-alignment straight edge is typically positioned on the calibration mechanism. In addition, the drive pipe may include a visual indicator aligned with the quick-alignment straight edge.

It will be understood that specific embodiments may include a variety of features in different combinations, and that all of the features described in this disclosure, or any particular set of features, needs to be included in particular embodiments. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which.

DESCRIPTION OF ILLUSTRATIVE EMBODIMENTS

An illustrative example of the invention is embodied in a line-of-sight quick-alignment linkage for a three-phase electric disconnect switch with rotating insulators for opening and closing the switch. This embodiment is a variation of the quick-alignment linkage described in U.S. Pat. Pub No. 20230298827, except that the drive pipe itself is not aligned with the actuator arm when the drive pipe is in the fully closed position. In this variation, the line-of-sight between a pivot point of the drive pipe and the actuator is used to guide setting the position of the drive pipe when adjusting the calibration mechanism during setup of the linkage.

An actuator connected to an actuator arm provides the motive force for operating the switch. The line-of-sight quick-alignment linkage includes a drive pipe, a linkage pipe, and a linkage interconnecting the drive pipe and the linkage pipe. The linkage includes quick-alignment straight edge configured to be aligned with the line-of-sight from a pivot point of the drive pipe to the actuator arm when the drive pipe is in the fully closed drive pipe position. The drive pipe may also include a flat surface with an alignment indicator configured to be parallel the quick-alignment straight edge when the drive pipe is in the fully closed drive pipe position. In this embodiment, the quick-alignment straight edge is positioned on the calibration mechanism, which may also include a visual indicator aligned with the quick-alignment straight edge.

The linkage calibration mechanism allows fine adjustment of the relative position of the drive pipe with respect to the linkage pipe, which in turn sets the relative position of the actuator arm with respect to the switch blades and jaws. In a representative embodiment, the calibration mechanism includes a linkage operating lever connected to the drive pipe, a linkage drive gear connected to the linkage pipe, and a calibration mechanism for finely adjusting the rotational position of the linkage drive gear with respect to the linkage operating lever. In the line-of-sight quick-alignment linkage, calibration mechanism includes a quick-alignment straight edge to aid in setting the drive pipe in the fully closed drive pipe position, which also sets the linkage operating lever in its fully closed position. The technician then rotates the linkage drive gear to its fully closed position and pins calibration mechanism to set the mechanism for the fully closed switch position. The technician moves the actuator arm to its fully closed position and tightens the actuator arm to the drive pipe to complete the linkage set up for the first phase. Finally, the technician adjust the positions of the drive linkages of the other phase on the linkage pipe so that all three phase switches are fully closed when the actuator arm reaches the fully closed position.

Figure 1:
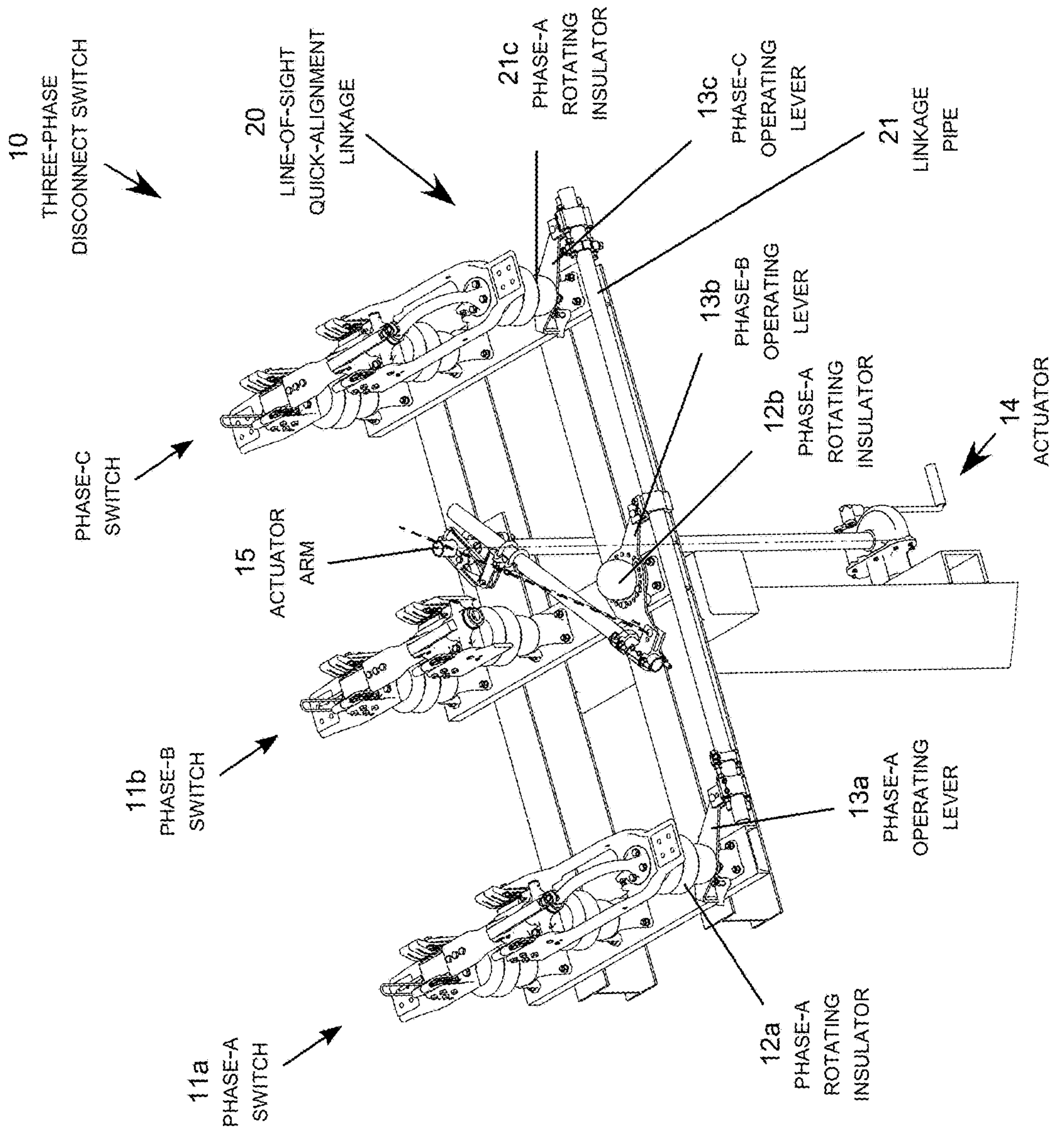
FIG. 1 is a perspective view of the three-phase disconnect switch including a line-of-sight quick-alignment linkage.

FIG. 1 is a perspective view of the three-phase disconnect switch 10 including the line-of-sight quick-alignment linkage 20. The three-phase disconnect switch 10 includes three phase disconnect switches, Phase-A switch 11*a*, Phase-B switch 11*b*, and Phase-C switch 11*c*. Each phase switch is opened and closed by a respective rotating insulator, Phase-A rotating insulator 12*a*, Phase-B rotating insulator 12*b*, and Phase-C rotating insulator 12*c*. Each rotating insulator is rotated by a respective phase operating lever 13*a*-13*c*. The phase operating levers are connected to the linkage pipe 22, which simultaneously translates the phase operating levers to open and close the phase switches 11*a*-11*c*. An actuator 14 rotates an actuator arm 15, which is connected to the linkage 20, to simultaneously open and closed the phase switches 11*a*-11*c*. The line-of-sight quick-alignment linkage 20 is used to properly set and calibrate the positions of the phase operating levers 13*a*-13*c* for simultaneous opening and closing of the phase switches 11*a*-11*c* by operation of the actuator 14.

Figure 2:
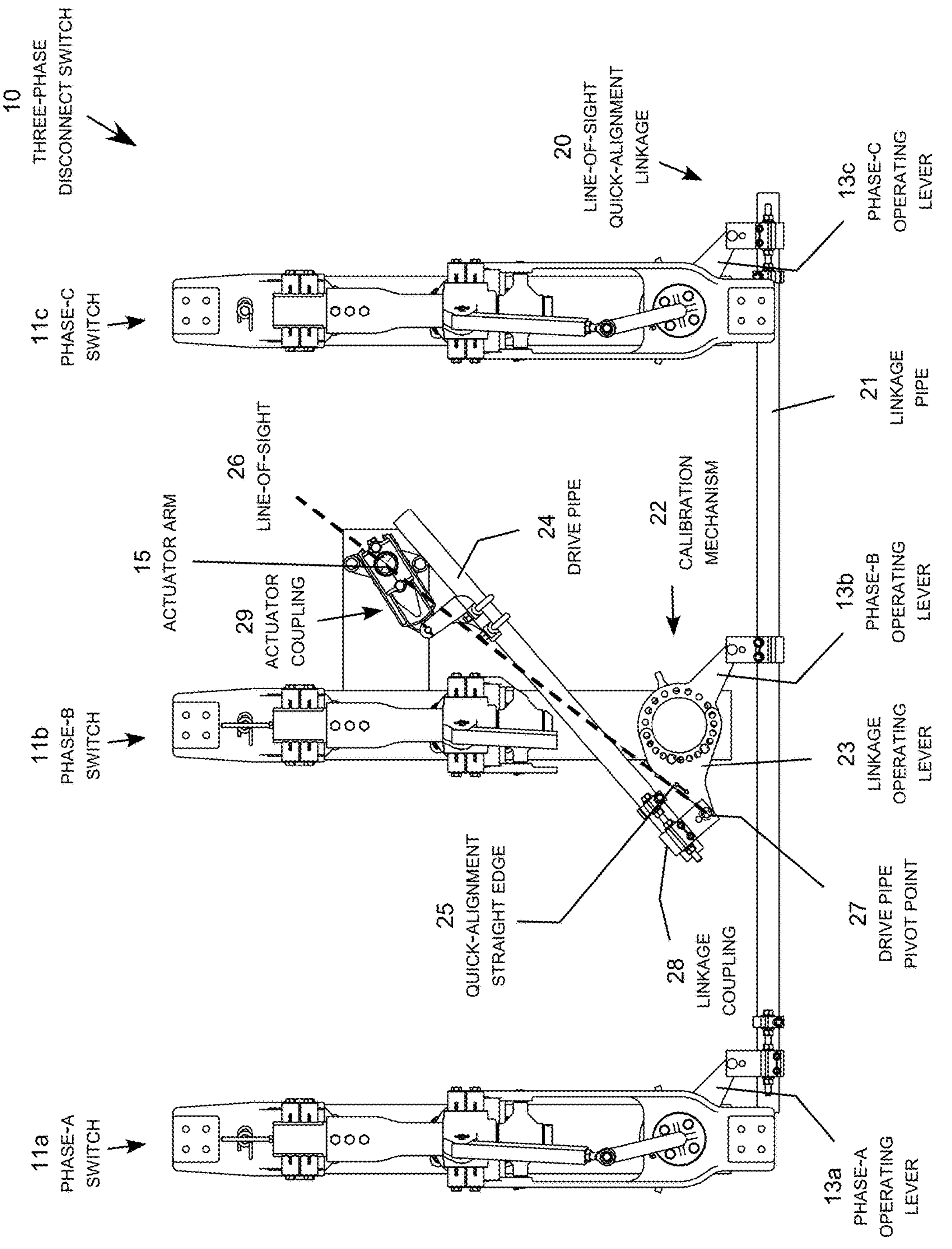
FIG. 2 is a top view of the three-phase disconnect switch including the line-of-sight quick-alignment linkage.
Figure 3A:
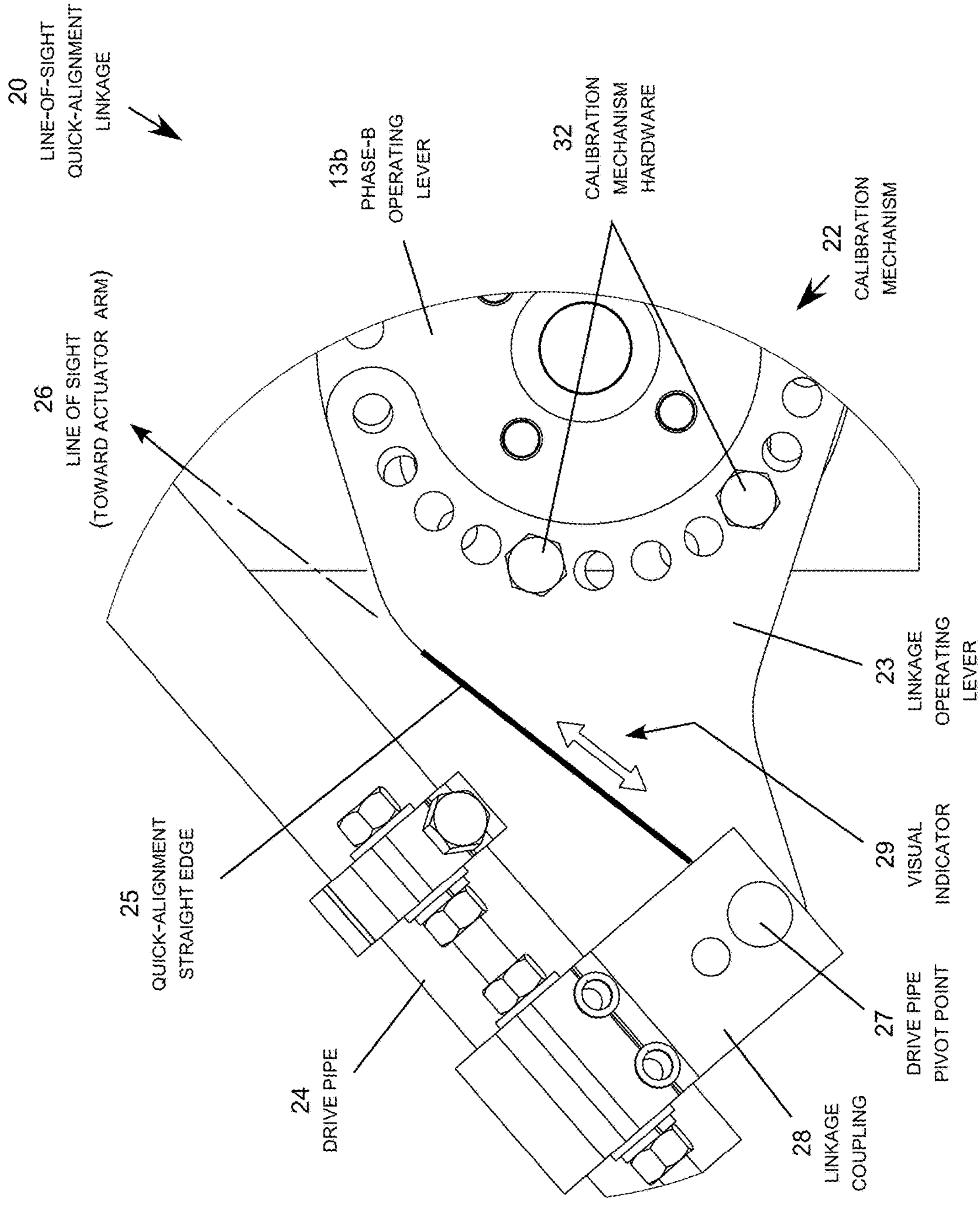
FIG. 3A is a top view of a portion of the line-of-sight quick-alignment linkage.

FIG. 2 is a top view of the three-phase disconnect switch 10 further illustrating the line-of-sight quick-alignment linkage 20. FIG. 3A shows an enlarged portion of the linkage 20. In this example, the Phase-B rotating insulator 12*b* is the driven insulator. The linkage 20 includes directional calibration mechanism 22 (also referred to as a vernier calibration mechanism) used to finely adjust the angle of the Phase-B operating lever 13*b* with respect to a linkage operating lever 23. The drive pipe 24 connects the linkage operating lever 23 to the actuator arm 15. To assist in properly calibrating the linkage 20, the linkage operating lever 23 includes a quick-alignment straight edge 25 that is aligned with the line-of-sight 26 between the drive pipe pivot point 27 on the linkage operating lever 23 and the actuator arm 15. As shown in FIG. 3A, the linkage operating lever 13*c* also includes a visual indicator 29 aligned with the quick-alignment straight edge 25.

The linkage operating lever 23 is positioned in the desired orientation when the quick-alignment straight edge 25 is aligned with the line-of-sight 26 from the drive pipe pivot point 27 on the linkage operating lever 23 and the actuator arm 15. In addition, the phase operating lever 13*b* is rotated until the Phase-B rotating insulator 12*b* is in the fully closed position. The calibration mechanism hardware 32 is then positioned the holes that are aligned by the calibration mechanism 22 to lock this angle of the calibration mechanism in place. This setting of the calibration mechanism 22 sets the fully closed drive pipe position to correspond to the fully closed position of the position of the Phase-B rotating insulator 12*b*, and thus the fully closed position of the Phase-B switch 11*b*.

The drive pipe 24 is mounted by an offset linkage coupling 28 to the linkage operating lever 23, and an offset actuator coupling 29 to the actuator arm actuator arm 15, causing the drive pipe to be offset from the line-of-sight 26. This embodiment varies from the embodiments described in U.S. Pat. Pub. No. 2023/0298827, in that the drive pipe 24 is not aligned with or parallel to the line-of-sight 26. For this reason, the line-of-sight 26 rather than the center line of the drive pipe 24 is used to orient the linkage operating lever 23.

Figure 3B:
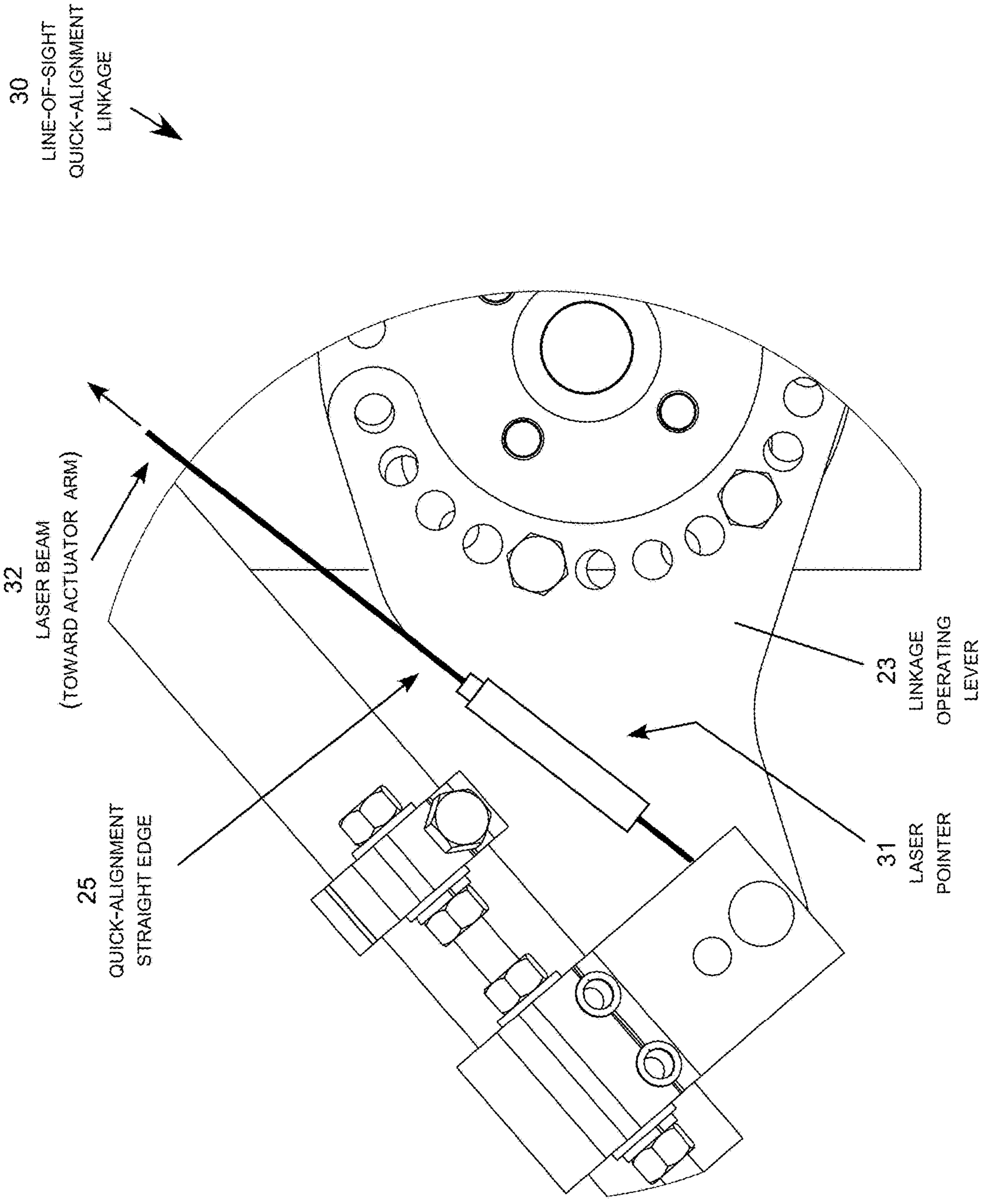
FIG. 3B is a top view of a portion of the line-of-sight quick-alignment linkage with a laser pointer.

FIG. 3B is a top view of an alternate portion of the line-of-sight quick-alignment linkage 30 with a laser pointer including a laser pointer 31 emitting a laser beam 32. The laser pointer 31 may include a magnet with a straight edge extending in the laser pointing direction making it easy for a technician to manually align the laser pointer with the quick-alignment straight edge 25. The linkage operating lever 23 is adjusted until the laser beam 32 falls on the center of the actuator arm connector. As other options, a string or optical sight may be used to assist the technician in finding the correct alignment.

Figure 4:
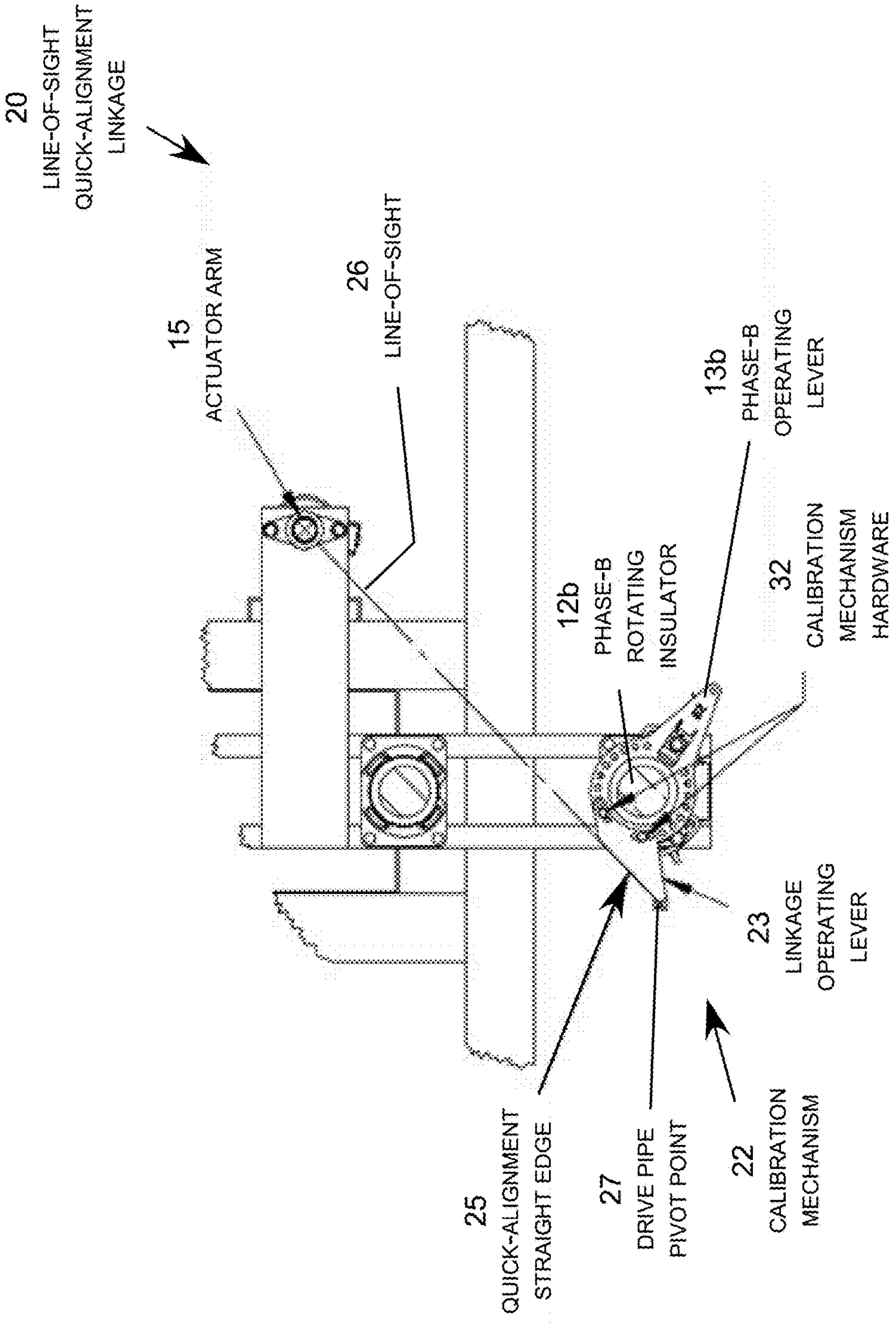
FIG. 4 illustrates a first step for setting the linkage.

FIG. 4 is top view of a portion of the line-of-sight quick-alignment linkage 20 illustrating a first step for setting up the linkage. The linkage operating lever 23 is rotated so that the quick-alignment straight edge 25 is aligned with the line-of-sight 26 between the drive pipe pivot point 27 on the linkage operating lever 23 and the actuator arm 15. The Phase-B operating lever 13*b* is then rotated until the Phase-B rotating insulator 12*b* is in the fully closed position. The calibration mechanism hardware 32, such as pins or bolts, is then installed in the aligned holes of the calibration mechanism 22 to lock the angle of the calibration mechanism in place with the Phase-B rotating insulator 12*b* is in the fully closed position.

Figure 5:
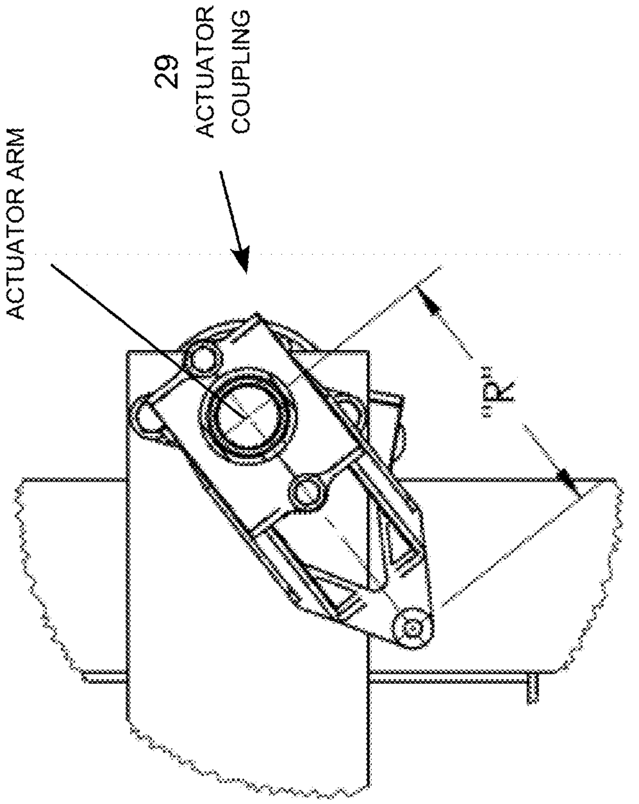
FIG. 5 illustrates a second step for setting the linkage.

FIG. 5 shows the next step is setting up the linkage 20, in which the actuator arm 15 is set to the fully closed position. With the actuator arm 15 is set to the fully closed position, the actuator coupling 29 is then rotated to the desired orientation toward the calibration mechanism 22.

Figure 6:
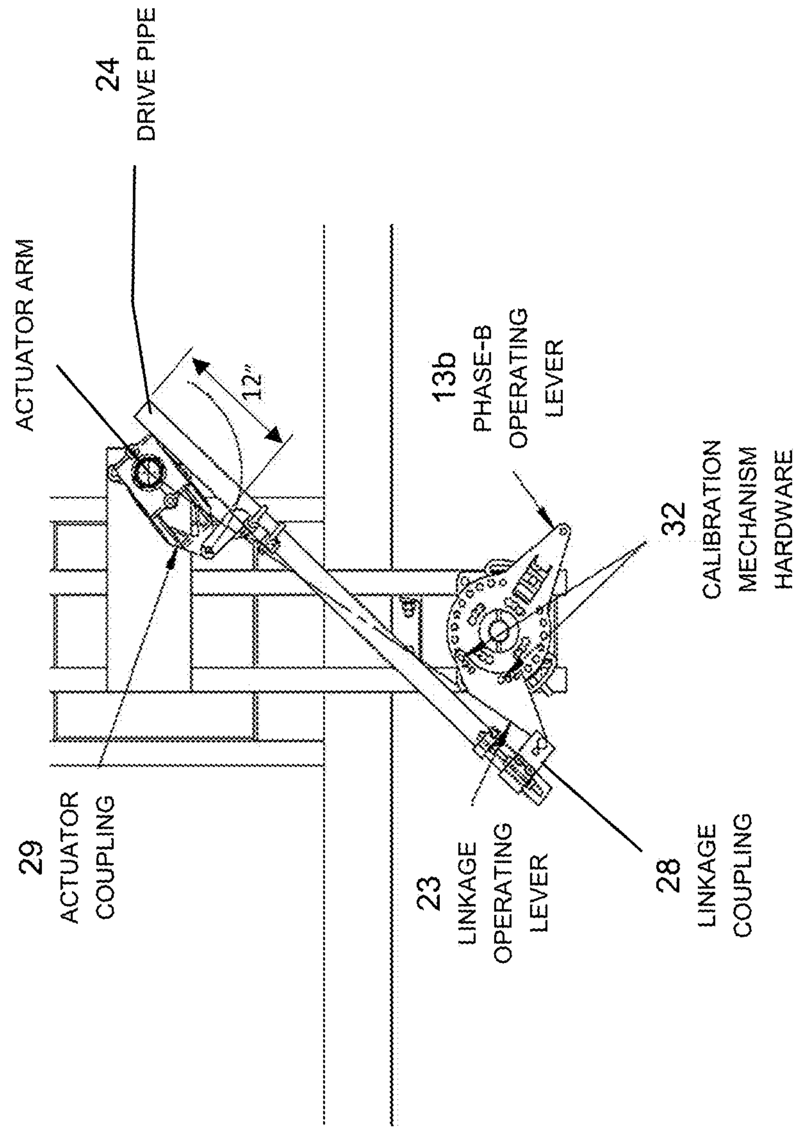
FIG. 6 illustrates a third step for setting the linkage.

FIG. 6 shows the next step is setting up the linkage 20, in which the drive pipe 24 is installed including the linkage coupling 28 and the remaining components of the actuator coupling 29 to interconnect the linkage operating lever 23 with the actuator arm 15. The actuator coupling 29 is then tightened onto the actuator arm 15, causing the fully closed position of the actuator arm 15 to correspond to the fully closed position of the Phase-B rotating insulator 12*b*. The Phase-B operating lever 13*b* is then rotated to its fully closed position corresponding to the fully closed position of the Phase-B rotating insulator 12*b*. The Phase-B drive linkage 70*b* is then secured to the linkage pipe 11, which completes setting up the linkage 20 for the Phase-B switch 11*b*.

Figure 7:
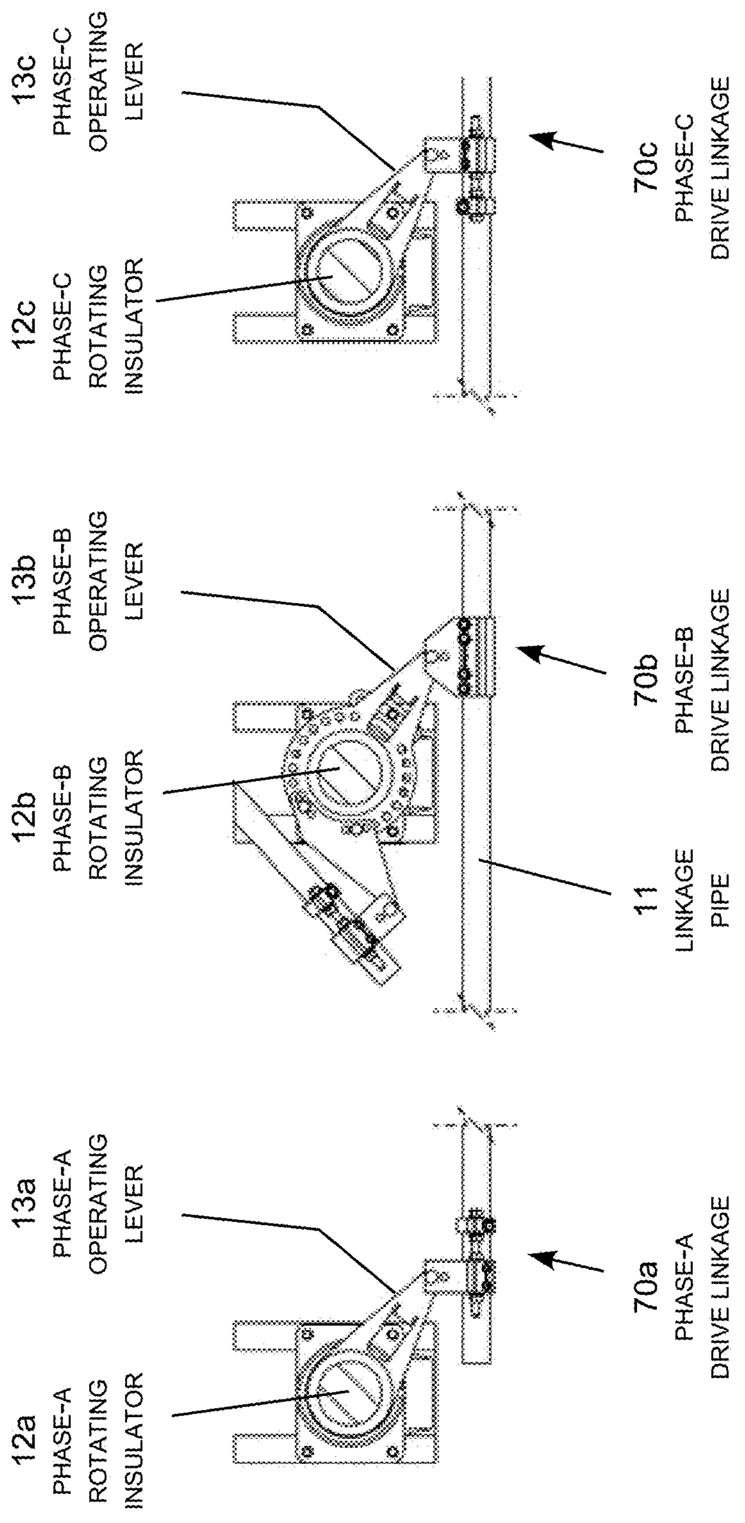
FIG. 7 illustrates a fourth step for setting the linkage.

FIG. 7 shows the next step is setting up the linkage 20, in which the Phase-A switch 11*a* and the Phase-C switch 11*c* and also set to their fully closed positions. Specifically, the Phase-A operating lever 13*a* is rotated to its fully closed position corresponding to the fully closed position of the Phase-A rotating insulator 12*a*. The Phase-A drive linkage 70*a* is then secured to the linkage pipe 11, which completes setting up the linkage 20 for the Phase-A switch 11*a*. Similarly, the Phase-C operating lever 13*c* is rotated to its fully closed position corresponding to the fully closed position of the Phase-C rotating insulator 12*c*. The Phase-C drive linkage 70*c* is then secured to the linkage pipe 11, which completes setting up the linkage 20 for the Phase-C switch 11*c*. As a result, driving the actuator arm 15 to its fully-closed position simultaneously drives the rotating insulators 12*a*-12*c* to their fully closed positions, which drives the phase switches 11*a*-11*c* to their fully closed positions. In other words, calibration of the linkage 20 sets all three phase switches 11*a*-11*c* to be in their fully closed positions when the actuator arm 15 is in its fully closed position.

Figure 8:
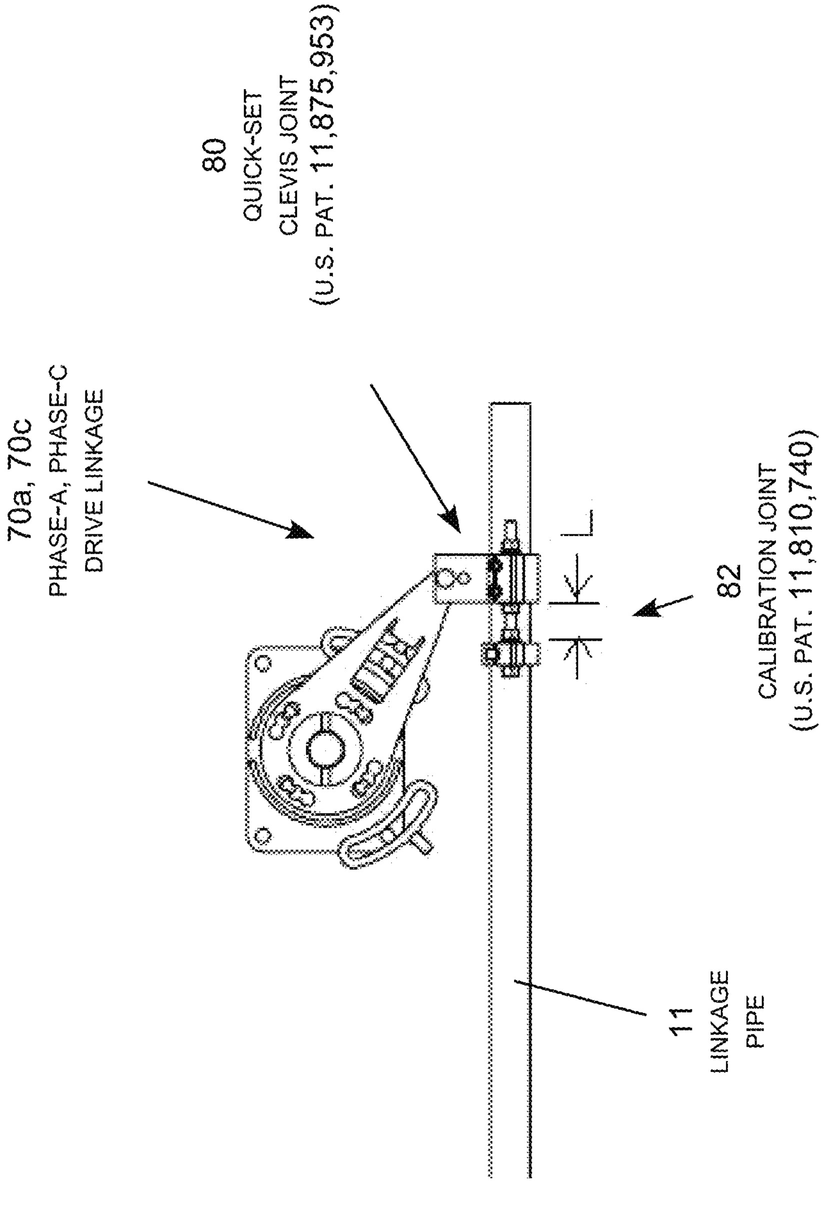
FIG. 8 illustrates a fifth step for setting the linkage.

As shown in FIG. 8, setting the positions of the phase linkages may be facilitated by the quick-set clevis joint 80 described in U.S. Pat. No. 11,875,953 and the calibration joint 82 described in U.S. Pat. No. 11,810,740, which are incorporated by reference.

The line-of-sight quick-alignment linkage need not be attached to the Phase-B insulator, as in the example embodiments described above, but may be attached to any of the phase insulators as a matter of design choice. Similarly, the drive pipe need not be installed at any particular angle to the linkage pipe, but is instead determined by the position of the actuator, which can very for different disconnect switches. The drive pipe may therefor be installed at any desired angle with respect to the linkage pipe as a matter of design choice. Regardless of these variations, the quick-alignment straight edge is always aligned with the line-of-sight between the drive pipe pivot point on the linkage operating lever and the actuator arm, which provides consistency for the technicians using the system.

Figure 9:
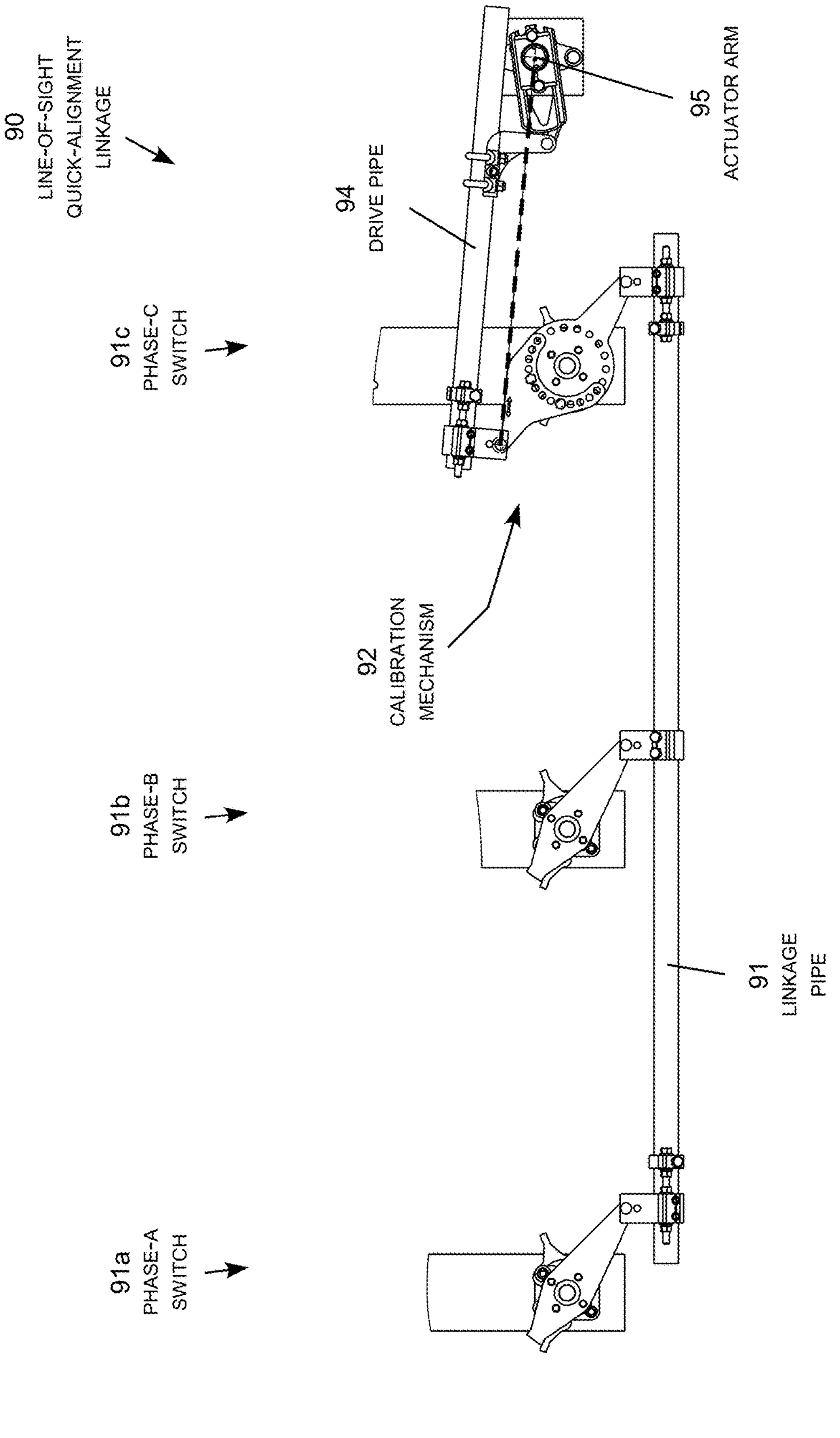
FIG. 9 is a top view of an alternative line-of-sight quick-alignment linkage.
Figure 10:
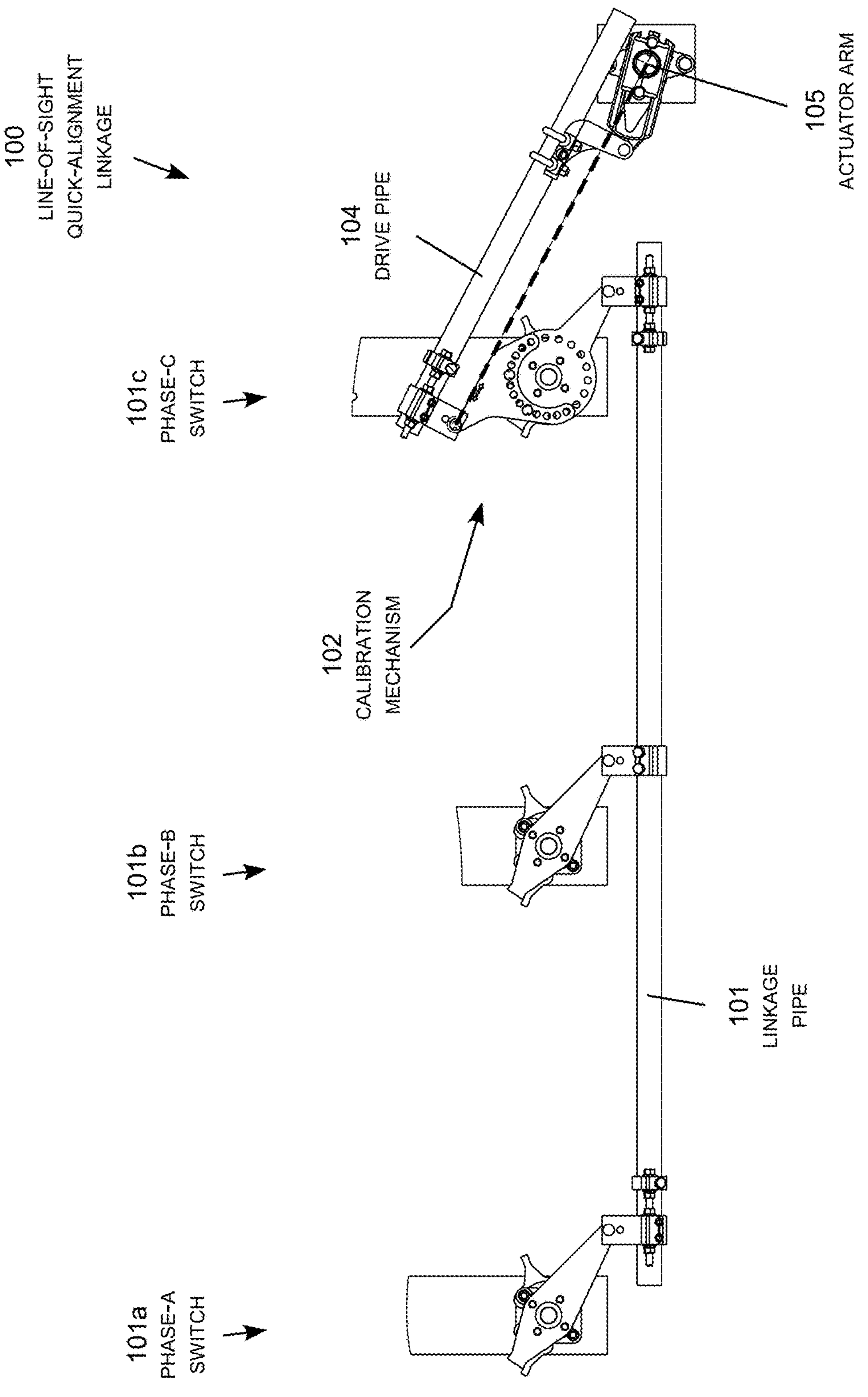
FIG. 10 is a top view of another alternative line-of-sight quick-alignment linkage.
Figure 11:
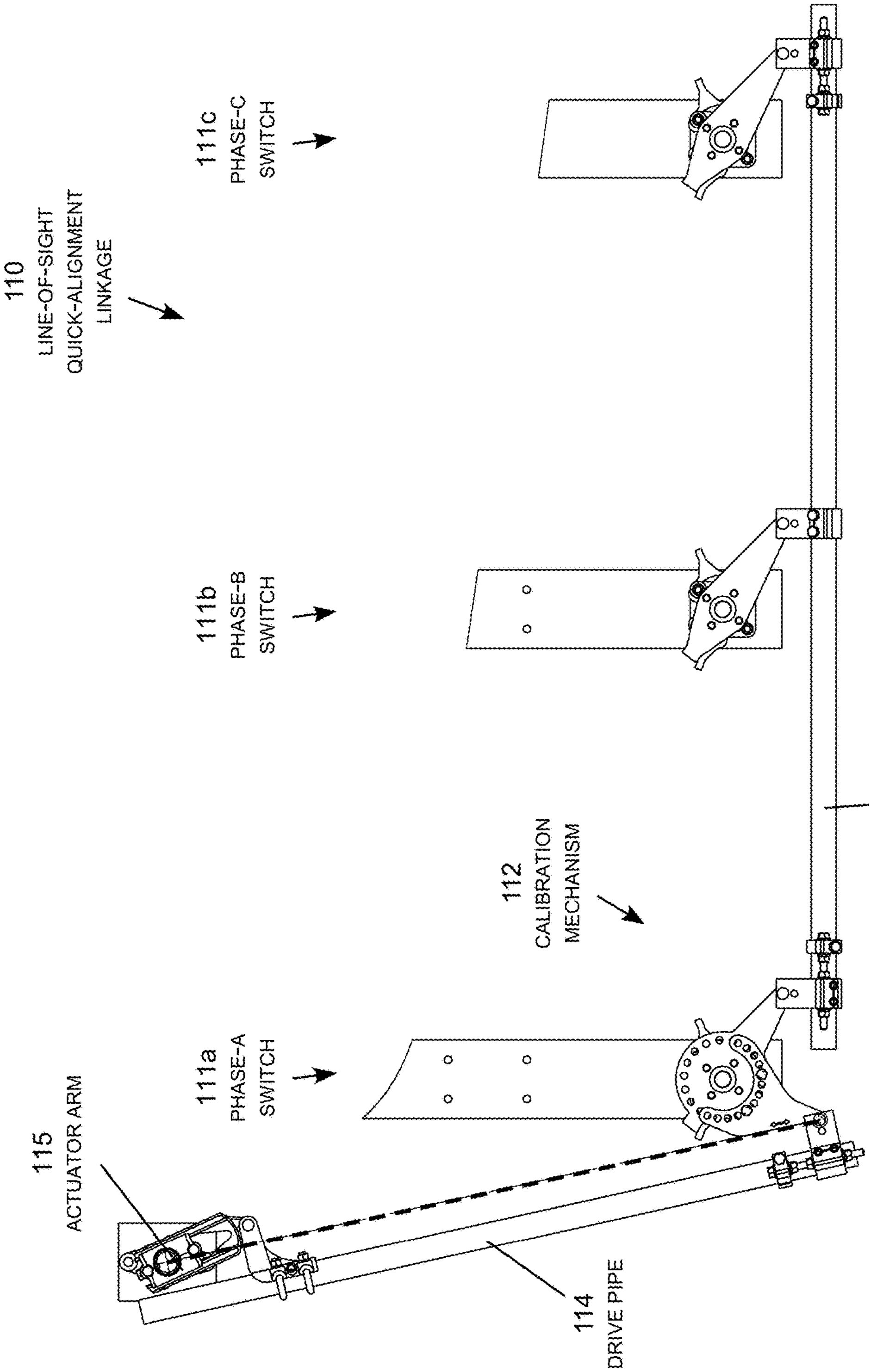
FIG. 11 is a top view of another alternative line-of-sight quick-alignment linkage.

To illustrate this versatility, FIG. 9 shows a line-of-sight quick-alignment linkage 90, in which the calibration mechanism 92 and drive pipe 94 connect the actuator arm 95 to the Phase-C switch 90*c*. In this embodiment, the angle between the drive pipe 94 and the linkage pipe 91 is quite different from the angle between the drive pipe 24 and the linkage pipe 21 of the embodiment 90 shown in FIG. 2. As another example, FIG. 10 shows a line-of-sight quick-alignment linkage 100, in which the calibration mechanism 102 and drive pipe 104 connect the actuator arm 105 to the Phase-C switch 101*c*. In this embodiment, the angle between the drive pipe 104 and the linkage pipe 101 is quite different from the angle between the drive pipe 94 and the linkage pipe 91 of the embodiment 90 shown in FIG. 9. As an other example, FIG. 11 shows a line-of-sight quick-alignment linkage 110, in which the calibration mechanism 112 and drive pipe 114 connect the actuator arm 115 to the Phase-A switch 111*a*. Again in this example, the angle between the drive pipe 114 and the linkage pipe 111 is quite different than the other embodiments. Nevertheless, in each embodiment the quick-alignment straight edge is aligned with the line-of-sight between the drive pipe pivot point on the linkage operating lever and the actuator arm.

The line-of-sight quick-alignment linkage itself is not tied to any particular switch configuration and may be employed with any suitable three-phase linkage. In view of the foregoing, it will be appreciated that present invention provides significant improvements in linkage calibration systems for high voltage disconnect switches. The foregoing relates only to the exemplary embodiments of the present invention, and numerous changes may be made therein without departing from the spirit and scope of the invention as defined by the following claims.

The invention claimed is:

1. A line-of-sight quick-alignment linkage for a three-phase electric disconnect switch, comprising:
- a drive pipe having a pivot point and a fully closed drive pipe position;
- an actuator arm operative to open and close the disconnect switch;
- a linkage pipe interconnecting the actuator arm with rotating insulators of the disconnect switch for opening and closing the disconnect switch;
- a calibration mechanism adjustable to interconnect the drive pipe and the linkage pipe at multiple operational angles;
- a quick-alignment straight edge configured to be aligned with a line-of-sight from the pivot point of the drive pipe to the actuator arm when the drive pipe is in the fully closed drive pipe position to guide setting the position of the drive pipe when adjusting the calibration mechanism during setup of the linkage.

2. The line-of-sight quick-alignment linkage of claim 1, wherein the quick-alignment straight edge is offset with respect to a centerline of the drive pipe when the drive pipe is in the fully closed drive pipe position.

3. The line-of-sight quick-alignment linkage of claim 1, wherein the quick-alignment straight edge is positioned on the calibration mechanism.

4. The line-of-sight quick-alignment linkage of claim 1, wherein the calibration mechanism comprises a visual indicator aligned with the quick-alignment straight edge.

5. The line-of-sight quick-alignment linkage of claim 4, wherein the calibration mechanism comprises a laser pointer aligned with the quick-alignment straight edge.

6. The line-of-sight quick-alignment linkage of claim 1, wherein the drive pipe and the actuator arm are transverse to each other.

7. The line-of-sight quick-alignment linkage of claim 1, further comprising a manually operated actuator for rotating the actuator arm to open and close the disconnect switch.

8. A three-phase electric disconnect switch having a fully closed switch position, comprising:
- rotating insulators operative to open and close the disconnect switch to the fully closed switch position;
- a drive pipe having a pivot point and a fully closed drive pipe position;
- an actuator arm operative to open and close the disconnect switch;
- a linkage pipe interconnecting the actuator arm with the rotating insulators of the disconnect switch for opening and closing the disconnect switch;
- a calibration mechanism adjustable to interconnect the drive pipe and the linkage pipe at multiple operational angles;
- a quick-alignment straight edge configured to be aligned with a line-of-sight from the pivot point of the drive pipe to the actuator arm when the drive pipe is in the fully closed drive pipe position to guide setting the position of the drive pipe when adjusting the calibration mechanism during setup of the linkage.

9. The three-phase electric disconnect switch of claim 8, wherein the quick-alignment straight edge is offset with respect to a centerline of the drive pipe when the drive pipe is in the fully closed drive pipe position.

10. The three-phase electric disconnect switch of claim 8, wherein the quick-alignment straight edge is positioned on the calibration mechanism.

11. The three-phase electric disconnect switch of claim 8, wherein the calibration mechanism comprises a visual indicator aligned with the quick-alignment straight edge.

12. The three-phase electric disconnect switch of claim 11, wherein the calibration mechanism comprises a laser pointer aligned with the quick-alignment straight edge.

13. The three-phase electric disconnect switch of claim 8, wherein the drive pipe and the actuator arm are transverse to each other.

14. The three-phase electric disconnect switch of claim 8, further comprising a manually operated actuator for rotating the actuator arm to open and close the disconnect switch.

* * * * *